United States Patent [19]

Legg

[11] 4,159,712
[45] Jul. 3, 1979

[54] SOLAR ENERGY CONVERSION UNIT

[76] Inventor: Howard W. Legg, 2229 North Park, Grand Island, Nebr. 68801

[21] Appl. No.: 844,031

[22] Filed: Oct. 20, 1977

[51] Int. Cl.² ............................................. F24J 3/02
[52] U.S. Cl. ................................................. 126/271
[58] Field of Search ............... 126/270, 271; 237/1 A; 60/641

[56] References Cited
U.S. PATENT DOCUMENTS

| 1,951,403 | 3/1934 | Goddard | 126/271 |
| 3,822,692 | 7/1974 | Demarest | 126/271 |
| 3,985,119 | 10/1976 | Oakes, Jr. | 126/271 |
| 4,015,584 | 4/1977 | Haberman | 126/271 |
| 4,066,062 | 1/1978 | Houston | 126/271 |

*Primary Examiner*—Kenneth W. Sprague
*Attorney, Agent, or Firm*—Clarence A. O'Brien; Harvey B. Jacobson

[57] ABSTRACT

A solar energy conversion unit having a collector forming a focal area in which is disposed a core assembly including a governor arranged for varying the surface area of fluid carrying tubes partly forming the core assembly that is exposed to solar radiation so as to maintain a desired fluid pressure within the conversion unit. At such time as the solar radiation impinging the collector becomes substantially less than that necessary to maintain suitable pressure in the fluid system of the unit, an auxiliary heater provided as part of the core assembly can be employed to supplement or replace the solar radiation.

12 Claims, 11 Drawing Figures

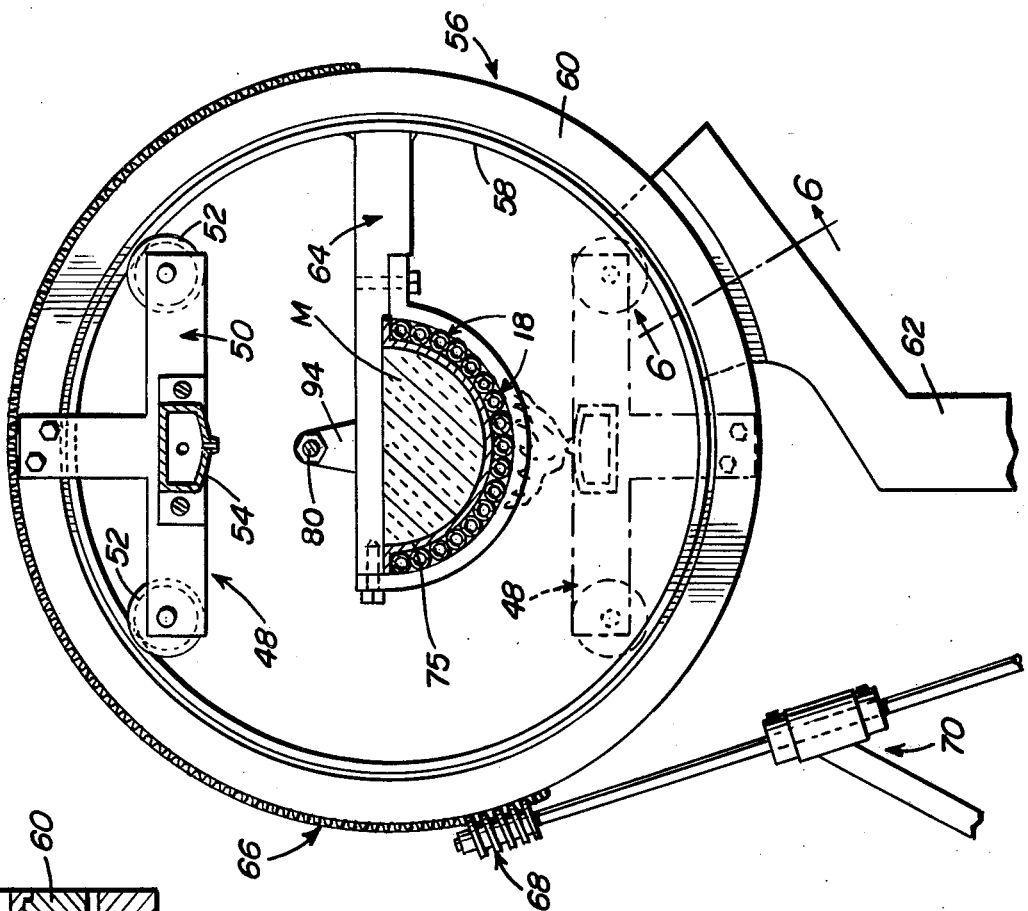
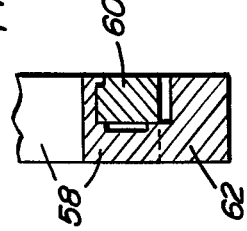
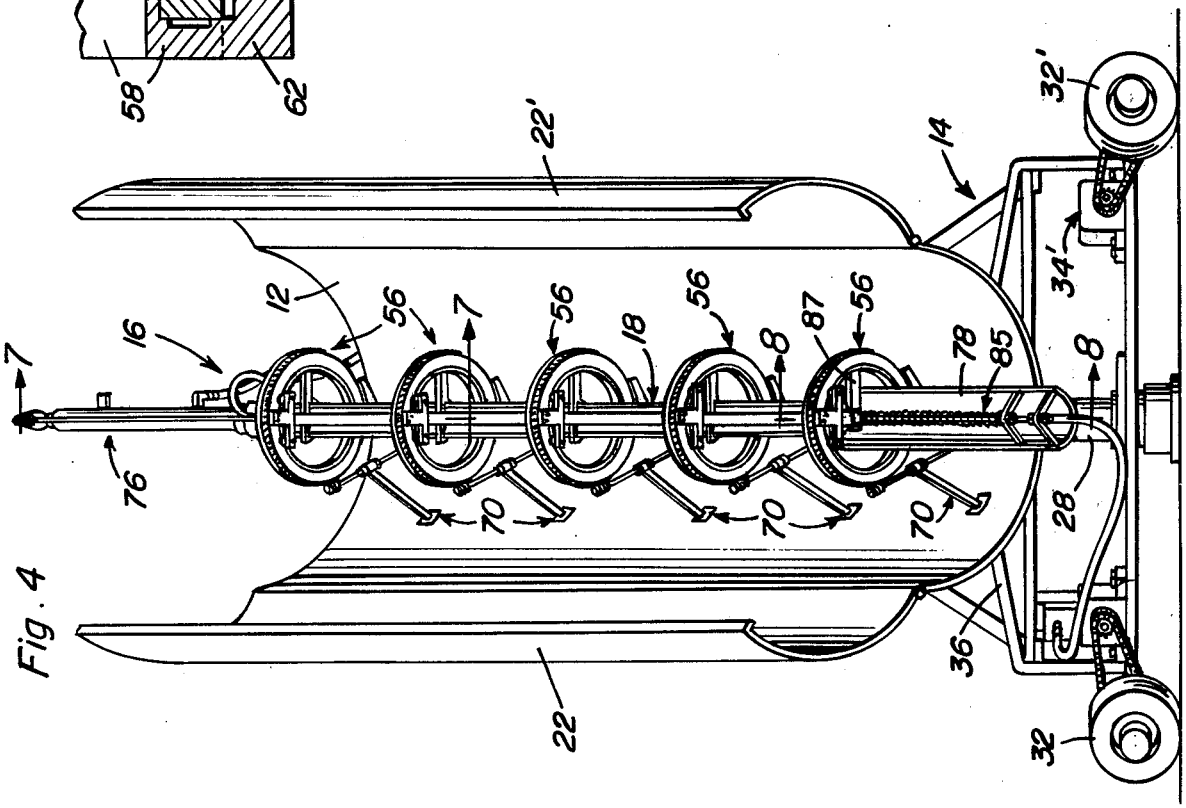

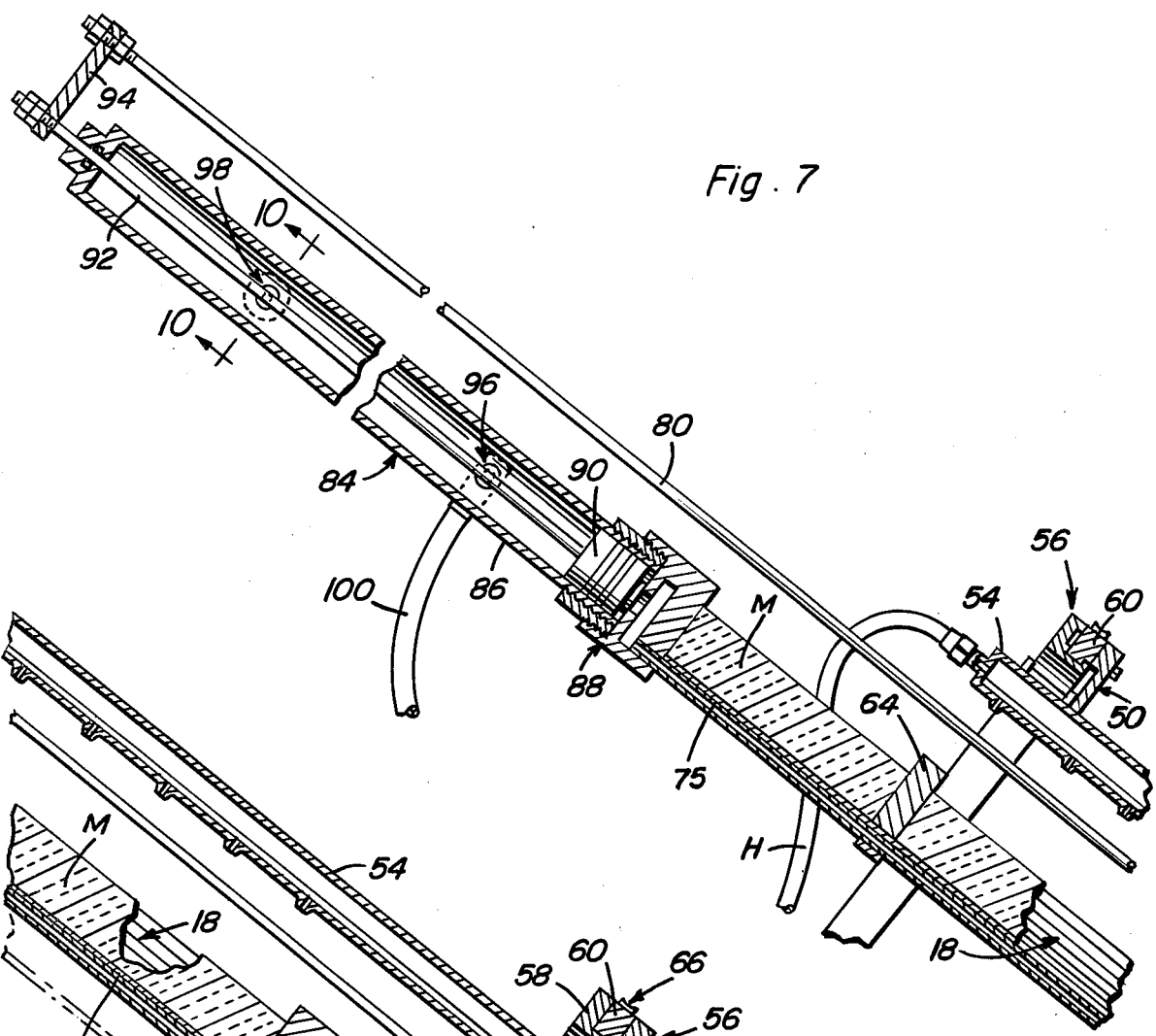
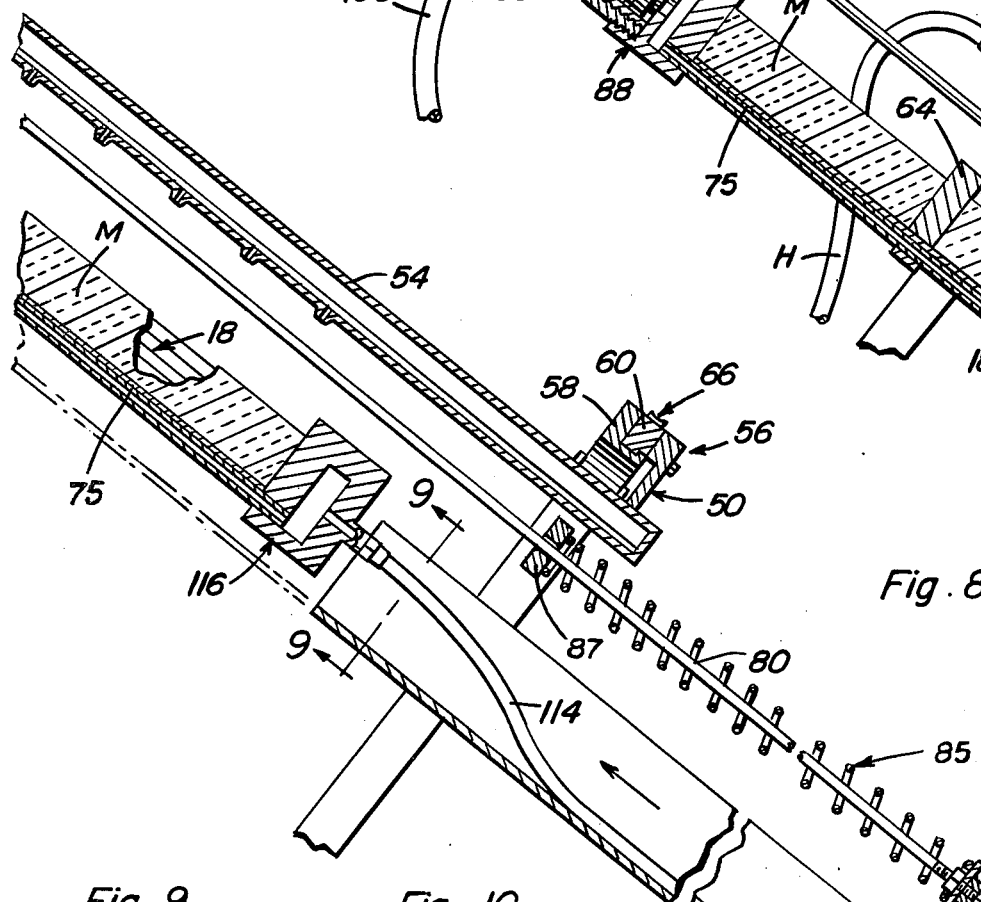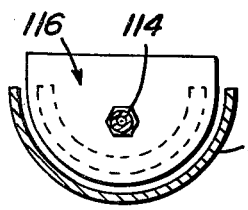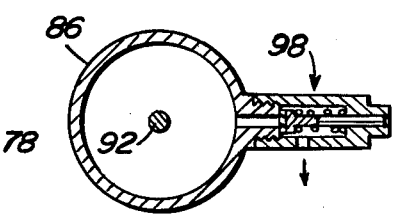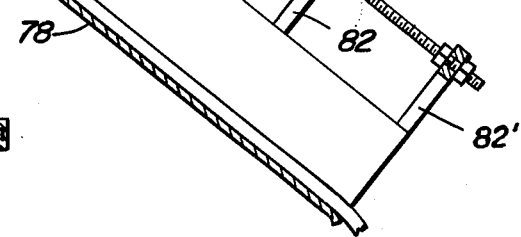

SOLAR ENERGY CONVERSION UNIT

BACKGROUND OF THE INVENTION

1. Field of the Invention

This invention relates generally to energy conversion devices, and particularly to a solar energy conversion unit provided with a source of auxiliary power to replace or supplement the normal solar energy at those times as such energy is unavailable, and which is self-governing in order to transmit a substantially constant fluid pressure to a turbine or other suitable power generating device associated with the unit.

2. Description of the Prior Art

It is generally known to provide a solar energy collecting device with an arcuate radiation-reflecting collector having associated therewith a core disposed substantially at the focal axis of the collector. Such a collector assembly is disclosed in U.S. Pat. No. 2,182,222, issued Dec. 5, 1939, to S. A. Courtis, et al., wherein the focal axis of the reflector is disposed substantially horizontally, and the reflector is mounted for movement about a horizontal axis parallel to the disposition of the radiation-receiving core. The single-passage core of this known solar heater must be arranged at the focal axis of the reflector, which requires a considerable spacing between the reflector surface and the core, while the device suffers from the basic problem with solar devices that it will not operate during cloudly weather, the nighttime or any other time when solar radiation is unavailable.

U.S. Pat. Nos.: 257,560, issued May 9, 1882, to G. W. Deitzler; 497,079, issued May 9, 1893, to M. L. Severy; 2,906,257, issued Sept. 29, 1959, to C. G. Abbot; and 2,994,318, issued Aug. 1, 1961, to W. C. Lee, disclose various constructions of solar heating devices having the same basic reflector and core arrangement of U.S. Pat. No. 2,182,222 discussed above.

U.S. Pat. No. 3,990,914, issued Nov. 9, 1976, to H. Weinstein, et al., discloses a tubular solar cell mounted within an arcuate collector, or reflector, so as to convert impinging radiation directly into electrical energy.

U.S. Pat. No. 3,822,692, issued July 9, 1974, to J. A. Demarest, discloses a controlled solar energized power generator which employs a secondary energy source in order to obtain a controlled temperature and pressure of a working fluid within the system.

SUMMARY OF THE INVENTION

It is an object of the present invention to provide a solar energy converting unit capable of operating at a substantially constant fluid pressure.

It is another object of the present invention to provide a solar energy conversion unit capable of operating continuously, irrespective of whether solar radiation is available at a given time.

It is yet another object of the present invention to provide a solar energy conversion unit having a fluid-carrying core structure of greater efficiency than the conventional structures used as collector cores.

These and other objects are achieved according to the present invention by provided a solar energy conversion unit having: a collector forming a focal area; a frame for mounting the collector for movement with the sun; and a core assembly forming a fluid passage and mounted on the frame at the focal area of the collector for receiving solar radiation from the collector and heating a fluid passing through the passage formed by the core assembly. More specifically, a preferred embodiment of the invention has the collector in the form of a longitudinally extending trough substantially semi-circular in cross section, with the core assembly including a plurality of substantially parallel, coextensive tubes arranged extending longitudinally of the extent of the trough and forming a further trough having a substantially semi-circular cross section. The tubes and collector are arranged so as to be substantially concentrically of one another, with the tubes being disposed within the trough of the collector for being protected thereby from winds and other efficiency reducing elements to which the unit may be exposed.

The collector advantageously includes a cover comprising a pair of cooperating doors arranged pivotally mounted on edges of the collector for swinging movement toward and away from one another.

The core assembly advantageously further includes an auxiliary heater which selectively applies heat directly to the tubes of the core assembly from a position between the tubes and the collector surface, but preferably adjacent the tubes, during periods when solar radiation is unavailable to the unit.

The core assembly preferably further includes a plurality of support stations, each of which stations comprises a ring assembly including an inner ring and an outer ring concentric with one another, and the outer ring being rotatably mounted on the inner ring. A column extends from the reflective surface of the collector and is affixed to the inner ring of the assembly for supporting same, with the tubes of the core assembly being cantilever mounted on the inner ring and the auxiliary heater being affixed to the outer ring for movement therewith relative to the tubes. The ring assembly further comprises a drive arrangement disposed for rotating the outer ring substantially 90 degrees, with this drive arrangement preferably including a rack provided about at least one-half of the outer circumference of the outer ring. A rotatably mounted worm gear, and the like, is arranged engaging the rack and connected to a source of power for being rotated thereby and causing rotation of the outer ring by engagement with the rack.

The core assembly advantageously further includes a governor associated with the tubes of the core assembly for controlling the pressure of a working fluid provided in the passage, or passages, formed in the tubes. This governor includes a shield mounted for reciprocating movement relative to the tubes of the core assembly, with this shield being disposed between the tubes and collector for blocking radiation reflected on the collector from striking a portion of the tubes overlapped by the shield. A servo motor responsive to a fluid pressure in the tubes is connected to the shield for positioning same relative to the tubes as a function of the fluid pressure in the tubes.

The frame of the unit preferably comprises a post on which an arm is rotatably mounted and extends longitudinally from the post so as to terminate in a free end thereof with a wheel rotatably mounted on the arm. The collector is pivotally mounted on the arm adjacent the wheel, and is supported for vertical swinging movement relative to the post and arm by a linear motor pivotally mounted on the post and connected to the collector.

These together with other objects and advantages which will become subsequently apparent reside in the details of construction and operation as more fully hereinafter described and claimed, reference being had to

BRIEF DESCRIPTION OF THE DRAWINGS

FIG. 4 is an enlarged, front elevational view showing the conversion unit with the doors open as seen in FIG. 1.

FIG. 5 is an enlarged, fragmentary, sectional view taken generally along the line 5—5 of FIG. 3.

FIG. 6 is a fragmentary, sectional view taken generally along the line 6—6 of FIG. 5.

FIG. 7 is an enlarged, fragmentary, sectional view taken generally along the line 7—7 of FIG. 4.

FIG. 8 is an enlarged, fragmentary, sectional view taken generally along the line 8—8 of FIG. 4.

FIG. 9 is a sectional view taken generally along the line 9—9 of FIG. 8.

FIG. 10 is a sectional view taken generally along the line 10—10 of FIG. 7.

DESCRIPTION OF THE PREFERRED EMBODIMENTS

Figure 1:
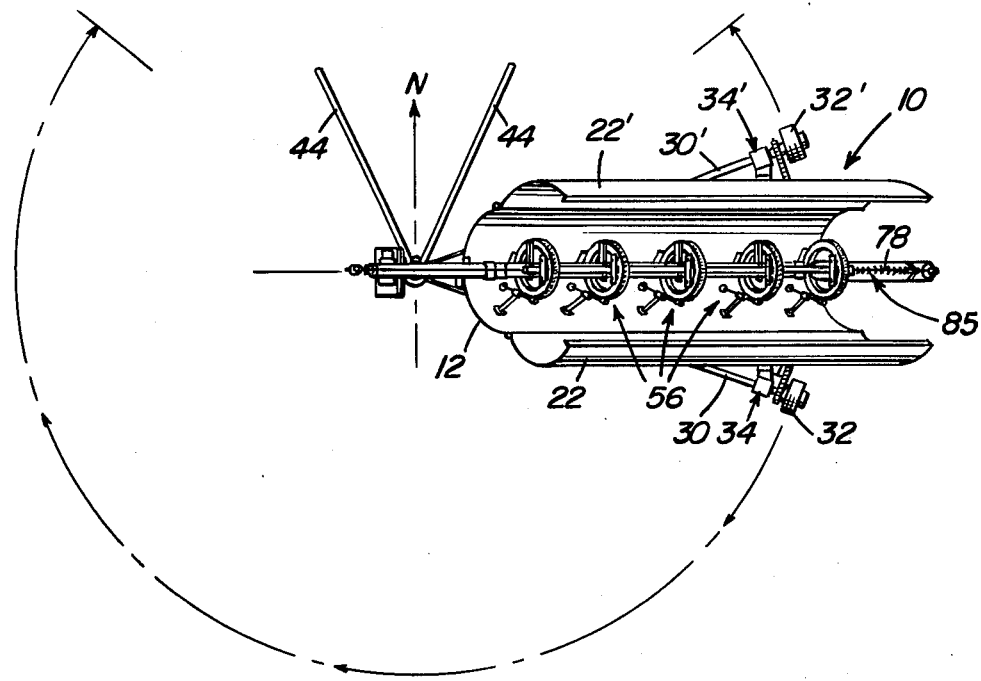
FIG. 1 is a partly schematic, top plan view showing a solar energy conversion unit according to the present invention.

Referring now more particularly to FIGS. 1 through 6 of the drawings, a solar energy conversion unit 10 according to the present invention includes a collector 12 in the form of a longitudinally extending trough substantially semi-circular in cross section and creating a focal area into which radiation impinging on the inner, or reflective, surface of collector 12 is directed. Collector 12 is mounted on a frame 14 for movement with the sun (not shown), while a core assembly 16 forming a fluid passage is disposed in the focal area of collector 12 for receiving solar radiation from collector 12 and heating a fluid passing through the passage formed by the core assembly 16.

Core assembly 16 includes a plurality of substantially parallel, coextensive tubes 18 arranged extending longitudinally of the extent of the trough formed by collector 12, and forming a further trough having a semi-circular cross section. The tubes 18 and collector 12 are arranged substantially concentrically of one another such that the tubes 18 are protected by collector 12 from wind and other environmental disturbances that would tend to reduce efficiency of the unit 10 and/or damage same.

Collector 12 has a pair of substantially parallel, spaced, longitudinally extending, peripheral edges, and includes a cover 20 comprising a pair of cooperating doors 22 and 22' arranged pivotally mounted on the edges of collector 12 for swinging movement toward and away from one another. More specifically, doors 22 and 22' are mounted as by the longitudinally extending hinges 24, 24', respectively, and can be opened and closed in a known manner as by the use of the illustrated jacks 26 and 26' controlled in conjunction with a conventional sun sensing system which positions frame 14, and collector 12, and brings an auxiliary heater, to be described below, into and out of an operating mode relative to tubes 18.

Frame 14 includes a generally vertically disposed post 28 which advantageously has the illustrated downwardly projecting pin for anchoring post 28 to a surface S, and the like, and which has rotatably mounted thereon adjacent surface S, as by a suitable collar, a pair of arms 30 and 30', for example, extending longitudinally from post 28 to a free end. A respective wheel 32, 32' is rotatably mounted on arms 30, 30' at the free ends thereof, with collector 12 being pivotally mounted on the arm adjacent wheel 32, 32'. Each wheel 32, 32' has associated therewith a respective drive motor 34, 34' mounted on arm 30, 30' and connected directly to wheel 32, 32' for selectively rotating same in cooperation with one another in order to cause frame 14 and therefore, collector 12 to rotate about an arc of some 270 degrees as shown in FIG. 1. It will be appreciated that since collector 12 need never be positioned so as to face a generally northerly direction, a full 360 degree rotation of frame 14 is unnecessary. The lower end of collector 12 can be pivotally mounted on the arms 30, 30' adjacent the free ends thereof as by the illustrated bracket 36 partially forming frame 14, lug portions of which bracket 36 are pinned to ears projecting from the lower arcuate surface of collector 12.

A linear fluid motor 38 of conventional construction is pivotally mounted on the upper end of post 28 and is connected to the upwardly disposed portion of collector 12, again by a pivotal connection, for swinging collector 12 vertically about the pivotal connection of collector 12 to bracket 36. Motor 38 receives fluid under pressure from a conventional pump unit 40 which would be connected to a conventional source of electric power (not shown), and the like, by means of a suitable solar tracking control system, not shown, but of a construction familiar to those in the solar energy tracking art and of a kind generally available on the market.

A brace 42 partially forms frame 14 together with a pair of braces 44 extending from the upper portion of post 28 so as to engage with surface S and rigidify frame 14, these braces 44 being disposed relative to surface S so as to be in a generally northerly direction from post 28 and be in that sector of a circle having an axis formed by post 28 that will not be traversed by frame 14 during an operating cycle of unit 10. Also mounted on frame 14 is a fluid system 46 which will be described in detail below.

Core assembly 16 further includes an auxiliary heater 48 which selectively applies heat directly to the lower surface of tubes 18 of core assembly 16 from a position between tubes 18 and collector 12 during periods when solar radiation is unavailable, such as at night or when the sky is overcast. This heater 48 includes a T-shaped frame 50 having a leg thereof affixed to a movable ring of a ring assembly to be described below, and having rollers 52 provided on the cross bar thereof for facilitating movement relative to a fixed ring of the ring assembly. More specifically, heater 48 includes a plurality of the frames 50 each provided with a set of rollers 52 and supporting a duct 54 extending longitudinally of the extent of collector 12, and tubes 18, and provided with a plurality of apertures forming burners for a combustible gas, and the like, fed into duct 54 as by hose H.

Tubes 18 and auxiliary heater 48 are supported by a plurality of support stations, each of which stations comprises a ring assembly 56 including an inner ring 58 and an outer ring 60 concentric with one another. Outer ring 60 is rotatably mounted on inner ring 58, the latter of which is fixedly supported within the trough of collector 12 as by an associated one of a plurality of columns 62. Tubes 18 are supported within ring assembly 56 by a respective cantilever 64 mounted on the fixed inner ring 58, while the leg of each of the T-shaped frames 50 of auxiliary heater 48 is affixed to outer ring 60 for rotation therewith so as to move from the storage, inoperative position seen in full lines in FIG. 5, to the operative position shown in broken lines in the same figure.

Ring assembly 56 includes a drive arrangement for rotating the outer ring 60 substantially 180 degrees, which drive arrangement includes a rack provided about at least one-half of the outer circumference of outer ring 60 and preferably slightly more than 180 degrees as illustrated, which cooperates with a rotatably mounted worm gear 68 arranged engaging rack 66 and the shaft of which is connected to a drive train 72 and, by means of which drive train 72, to a suitable motor 74 mounted on the lower portion of the bottom surface of collector 12 and energized in a suitable manner, such as electric current, from the aforementioned conventional control system (not shown) which controls the operation of pump 40.

While a chain and sprocket drive train 72 is illustrated in the drawings, it is to be understood that any suitable system, such as belts and pulleys, may be employed as the drive train, with it also being understood that any suitable source of power can be employed for actuating pump 40 and motor 74.

A piece of sheet metal 75, and the like, can be formed as a trough to fit between the core supports or ring assemblies 56 and filled with a suitable foamed material M having good thermal insulating properties to form a radiation and convection retard.

Referring now more particularly to FIGS. 7 through 10 of the drawings in addition to FIGS. 1 through 6, core assembly 16 further includes a governor 76 associated with tubes 18 for controlling the pressure of a working fluid provided in tubes 18. More specifically, governor 76 includes a generally arcuate shield 78 mounted for reciprocating movement relative to the longitudinal extent of tubes 18, with the shield 78 being disposed between tubes 18 and the reflective surface of reflector 12, but adjacent to tubes 18, for blocking radiation reflected from the collector 12 to the portion of tubes 18 overlapped by shield 78. This shield 78 is suspended from a rod 80 as by the illustrated hangers 82, 82' for connection by means of rod 80 to a servo motor 84 responsive to a fluid pressure within the passages formed by tubes 18 so as to position shield 78 relative to tubes 18 as a function of such fluid pressure, while a coiled compression spring 85 is arranged surrounding rod 80 between hanger 82 and a bracket 87 mounted on the lowermost ring 58 for biasing shield 78 away from tubes 18.

Servomotor 84 includes a cylinder 86 connected at a one end directly to a manifold 88 forming a header for the upper end of tubes 18, and slidably receiving a piston 90, the piston rod 92 of which passes through the upper end wall of cylinder 86 and is connected to the adjacent end of rod 80 as by the illustrated coupling 84. By this arrangement, it will be appreciated that movement of piston 90 away from manifold 88 will cause piston rod 92 to move rod 80 and, therefore, shield 78 in the same direction so that shield 78 will overlap a greater portion of the adjacent ends of the tubes 18, with spring 85 providing a return bias when the pressure on piston 90 is reduced. Once piston 90 moves along cylinder 86 so as to expose a valve 96 to the pressure of fluid in manifold 88 and tubes 18, the working fluid at a pressure of, for example, approximately 700 p.s.i. ($48.2 \times 10^6$ dynes per square centimeter) is allowed to be directed into fluid system 46. A safety valve 98 is provided further along cylinder 86 to permit blowoff from cylinder 86 should piston 90 be exposed to such a pressure as to move completely to the upper end of the cylinder 86. Such a pressure, could be, for example, 1050 p.s.i. ($72.4 \times 10^6$ dynes per square centimeter) in order to prevent damage to servomotor 84 or main power turbine overrun, or it could very easily blow up.

A fluid line 100 is connected to valve 96 and partially forms fluid system 46 in order to carry fluid from valve 96, and manifold 88, to a conventional turbine 102 (FIG. 3) included in system 46. A line 104 connects turbine 102 to a conventional condenser 106 mounted on brace 42 of frame 14, and a further line 108 carries the condensed working fluid, which had been changed into a vapor within the tubes 18, to a conventional high pressure pump 110. Holding tanks 112 and 112' are preferably associated with turbine 102, by insertion into line 100, and pump 110, by insertion into line 108, in order to assure an even flow of the working fluid into the turbine 102 and pump 110, respectively. A line 114 carries the condensed working fluid under pressure from pump 110 to a manifold 116 forming a header at the lower end of tubes 18 so that the condensed fluid can again be vaporized within the tubes 18 and the above cycle repeated.

Figure 11:
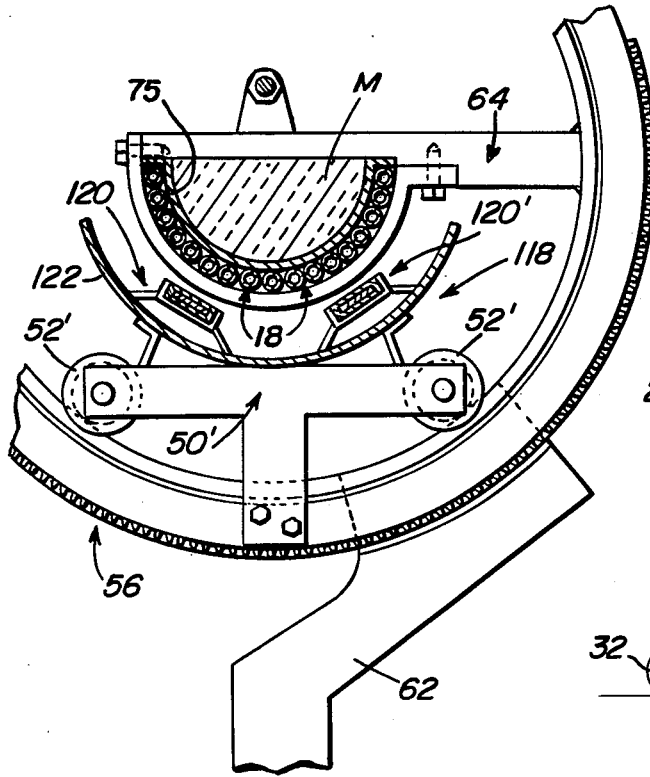
FIG. 11 is a fragmentary, cross-sectional view, similar to FIG. 5, but showing a modified embodiment of an auxiliary heater according to the present invention.
Figure 2:
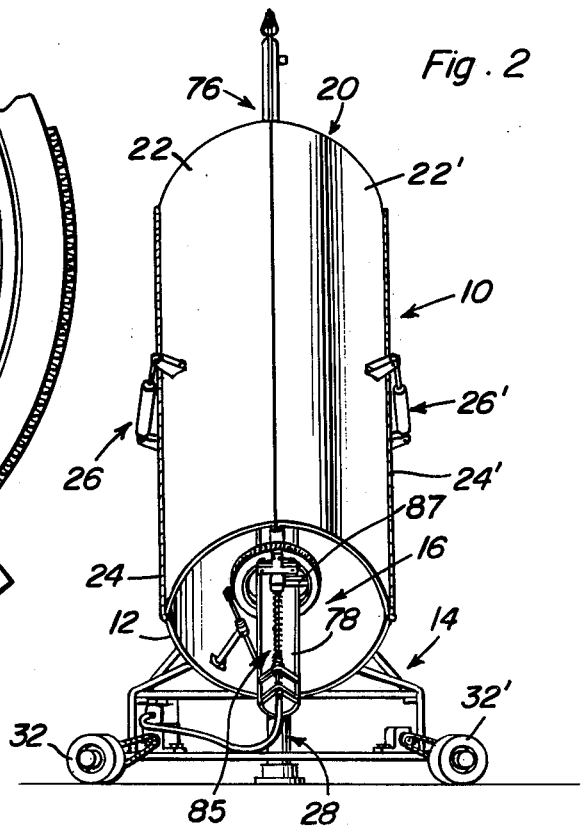
FIG. 2 is an enlarged, front elevational view of the conversion unit seen in FIG. 1, but with the collector cover doors seen in a closed mode.
Figure 3:
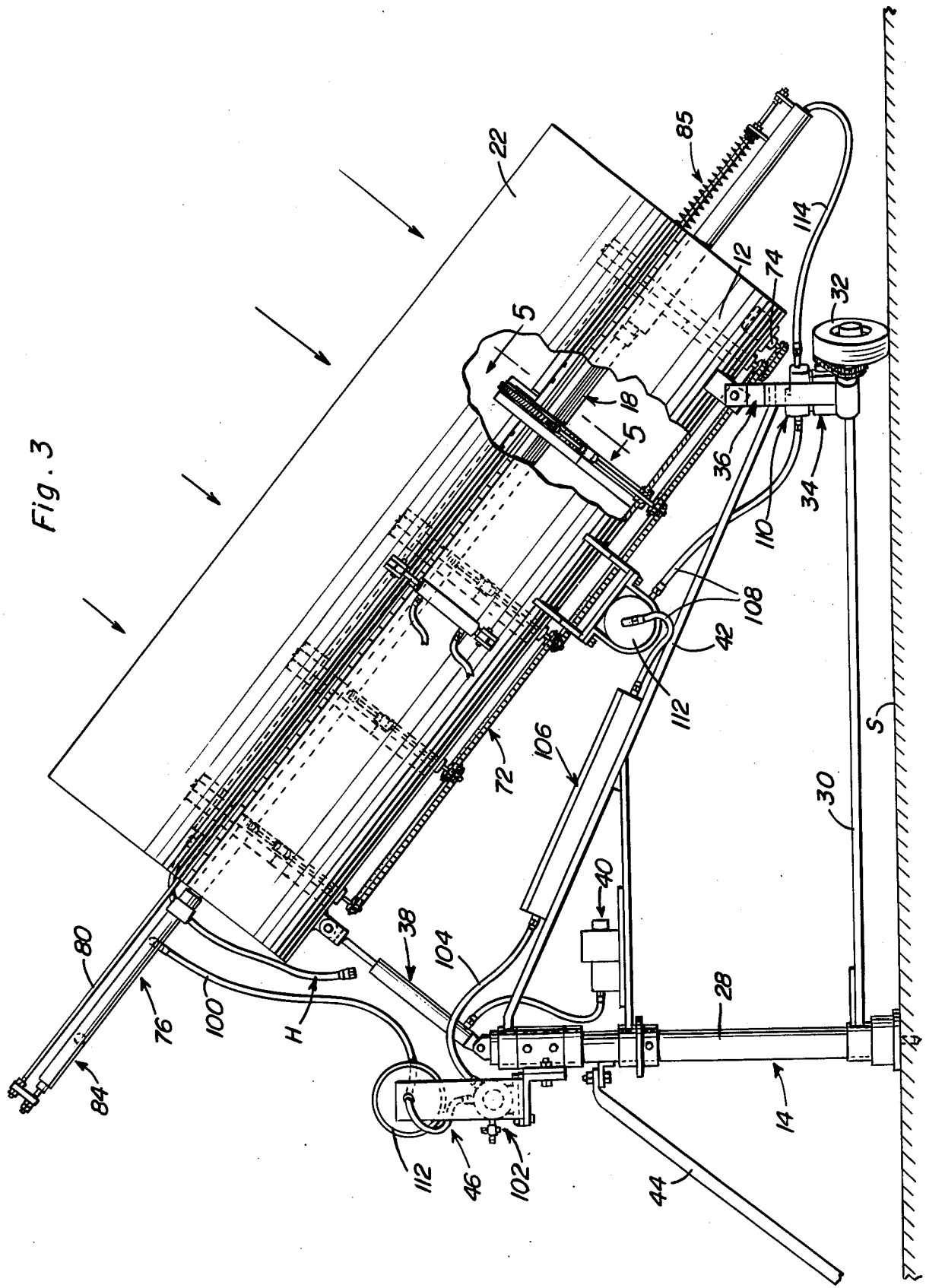
FIG. 3 is an enlarged, fragmentary, side elevational view, partly cut away into section, showing the conversion unit as seen in FIG. 1.

FIG. 11 shows a modified embodiment of the invention wherein an auxiliary heater 118 is provided in place of heater 48. This heater 118 includes a, for example, pair of electrical heating elements 120 and 120' mounted on an arcuate reflector 122 itself affixed to the crossbar of a T-shaped frame 50 provided with rollers 52' and affixed to the rotatable outer ring of a ring assembly 56 for operation in essentially the same manner as heater 48.

As can be readily understood from the above description and from the drawings, a solar energy conversion unit according to the present invention provides a comprehensive system for continuous power output, as at the output shaft of the turbine 102, regardless of whether solar energy is available. Collector 12 and frame 14 on which the collector is mounted can be caused to track the sun in a conventional manner by use of known sun sensing systems, or the jacks 26, 26' and the motors 34, 34', 38, and 74 can be manually operated as by the use of conventional switches (not shown). While only a single unit is disclosed, it is to be understood that the units can be mounted in plural form by suitable side-by-side arrangement in a manner not shown.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. A solar energy conversion unit, comprising, in combination:

(a) a collector forming a focal area for radiation received from the sun;
(b) frame means for mounting the collector for movement with the sun;
(c) core means forming a fluid passage and mounted on the frame and arranged at the focal area of the collector for receiving solar radiation from the collector and heating a fluid passing through the passage formed by the core means, wherein the collector is a longitudinally extending trough substantially semicircular in cross section, with the core means including a plurality of tubes arranged extending longitudinally of the extent of the trough and forming a further trough having a semicircular cross section, the tubes and collector being arranged substantially concentrically with one another with the tubes being disposed within the trough, wherein the collector has a pair of substantially parallel, spaced, longitudinally extending, peripheral edges, and includes a cover comprising a pair of cooperating doors arranged pivotally mounted on the edges of the collector by longitudinally extending hinges for swinging movement toward and away from one another.

2. A solar energy conversion unit, comprising, in combination:
(a) a collector forming a focal area for radiation received from the sun;
(b) frame means for mounting the collector for movement with the sun;
(c) core means forming a fluid passage and mounted on the frame and arranged at the focal area of the collector for receiving solar radiation from the collector and heating a fluid passing through the passage formed by the core means, wherein the collector is a longitudinally extending trough substantially semicircular in cross section, with the core means including a plurality of tubes arranged extending longitudinally of the extent of the trough and forming a further trough having a semicircular cross section, the tubes and collector being arranged substantially concentrically with one another with the tubes being disposed within the trough, the core means further including an auxiliary heater means for selectively applying heat directly to the tubes of the core means from a position between the tubes and the collector during periods when solar radiation is unavailable, and the core means further including a plurality of support stations, each of which support stations comprises, in combination:
(1) a ring assembly including an inner ring and outer ring concentric with one another, the outer ring being rotatably mounted on the inner ring; and
(2) a column extending from the collector and affixed to the inner ring for supporting the ring assembly, the tubes being cantilever mounted on the inner ring and the auxiliary heater means being affixed to the outer ring for movement therewith relative to the tubes.

3. A structure as defined in claim 2, wherein the outer ring has an outer circumference, and the ring assembly further comprising drive means for rotating the outer ring substantially 180 degrees, the drive means including a rack provided about at least one-half of the outer circumference of the outer ring, and a rotatably mounted worm gear arranged engaging the rack and connected to a source of power for rotation thereby and rotating the outer ring relative to the inner ring.

4. A structure as defined in claim 3, wherein the core means further includes an auxiliary heater means for selectively applying heat directly to the tubes of the core means from a position between the tubes and the collector during periods when solar radiation is unavailable.

5. A structure as defined in claim 4, wherein the collector has a pair of substantially parallel, spaced, longitudinally extending, peripheral edges, and includes a cover comprising a pair of cooperating doors arranged pivotally mounted on the edges of the collector for swinging movement toward and away from one another.

6. A structure as defined in claim 5, wherein the core means further includes governor means associated with the tubes for controlling the pressure of a working fluid provided in the tubes.

7. A structure as defined in claim 6, wherein the governor means comprises, in combination:
(3) a shield mounted for reciprocating movement relative to the tube of the core means, the shield being disposed between the tubes and collector for blocking radiation reflected on the collector from a portion of the tubes overlapped by the shield; and
(4) servo means connected to the shield and to the tubes, and responsive to a fluid pressure in the tubes, for positioning the shield relative to the tubes as a function of fluid pressure in the tubes.

8. A structure as defined in claim 7 wherein the frame means includes, in combination:
(5) a post;
(6) an arm rotatably mounted on the post and extending longitudinally from the post to a free end;
(7) a wheel rotatably mounted on the free end of the arm, the collector being pivotally mounted on the arm adjacent the wheel; and
(8) linear motor means pivotally mounted on the post and connected to the collector for swinging the collector vertically above the pivotal mounting of the collector on the arm.

9. A solar energy conversion unit, comprising, in combination:
(a) a collector forming a focal area for radiation received from the sun;
(b) frame means for mounting the collector for movement with the sun;
(c) core means forming a fluid passage and mounted on the frame and arranged at the focal area of the collector for receiving solar radiation from the collector and heating a fluid passing through the passage formed by the core means, wherein the core means includes a plurality of longitudinally extending tubes and the core means further includes an arcuate shield for controlling the pressure of a working fluid in the passage provided in the core means, responsive to the pressure of the fluid in the passage so as to position the shield relative to the tubes as a function of such fluid pressure.

10. A solar energy conversion unit, comprising, in combination:
(a) a collector forming a focal area for radiation received from the sun;
(b) frame means for mounting the collector for movement with the sun;

(c) core means forming a fluid passage and mounted on the frame and arranged at the focal area of the collector for receiving solar radiation from the collector and heating a fluid passing through the passage formed by the core means, wherein the frame means includes, in combination:
(1) a post;
(2) an arm rotatably mounted on the post and extending longitudinally from the post to a free end;
(3) a wheel rotatably mounted on the free end of the arm, the collector being mounted on the arm adjacent the wheel; and
(4) linear motor means pivotally mounted on the post and connected to the collector for swinging the collector vertically above the pivotal mounting of the collector on the arm.

11. In a solar energy conversion unit comprising a collector and a core assembly having a passage forming core holding a working fluid, a governor for controlling the pressure of the working fluid, the governor comprising, in combination:
(a) a shield mounted for reciprocating movement relative to the passage forming core of the unit, the shield being disposed between the core and the collector of the unit for blocking radiation reflected from the collector toward a portion of the core being overlapped by the shield; and
(b) servo means connected to the shield and connectable to the core of the unit and responsive to the pressure of the working fluid in the core for positioning the shield relative to the core as a function of fluid pressure in the core.

12. A collector assembly for a solar energy conversion unit, comprising, in combination:
(a) a collector having a reflective surface forming a focal area; and
(b) core means including a plurality of longitudinally extending, co-extensive, tubes forming a multi-section fluid passage and arranged at the focal area of the collector for receiving solar radiation from the collector and heating a fluid passing through the passage formed by the tubes, the core means further including an auxiliary heater means associated with the tubes for selectively applying heat directly to the tubes of the core means from a position between the tubes and collector during periods when solar radiation is unavailable, the core means further including a plurality of support stations, each of which support stations comprises, in combination:
(1) a ring assembly including an inner ring and outer ring concentric with one another, the outer ring being rotatably mounted on the inner ring; and
(2) a column extending from the collector and affixed to the inner ring for supporting the ring assembly, the tubes being cantilever mounted on the inner ring and the auxiliary heater means being affixed to the outer ring for movement therewith relative to the tubes.

* * * * *